(12) United States Patent
Bachochin

(10) Patent No.: US 7,963,756 B2
(45) Date of Patent: Jun. 21, 2011

(54) SEGMENTED TIRE MOLD

(75) Inventor: Todd Andrew Bachochin, Berlin Center, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/620,838

(22) Filed: Nov. 18, 2009

(65) Prior Publication Data
US 2011/0117229 A1     May 19, 2011

(51) Int. Cl.
*B29C 35/02* (2006.01)
(52) U.S. Cl. .......................................................... 425/46
(58) Field of Classification Search .................... 425/46, 425/47
See application file for complete search history.

(56) References Cited

U.S. PATENT DOCUMENTS

| | | | | |
|---|---|---|---|---|
| 3,337,918 A | * | 8/1967 | Pacciarini et al. | 425/39 |
| 3,730,658 A | * | 5/1973 | Marra | 425/46 |
| 3,741,696 A | * | 6/1973 | Greenwood | 425/46 |
| 3,922,122 A | * | 11/1975 | Bottasso et al. | 425/46 |
| 4,013,390 A | | 3/1977 | Moeller et al. | 425/47 |
| 4,022,554 A | | 5/1977 | MacMillan | 425/23 |
| 5,165,939 A | * | 11/1992 | Pizzorno | 425/47 |
| 5,208,044 A | | 5/1993 | Miyata et al. | 425/32 |
| 5,676,980 A | | 10/1997 | Gulka et al. | 425/40 |
| 6,017,206 A | | 1/2000 | Soulalioux | 425/35 |
| 6,318,985 B1 | | 11/2001 | Heindel et al. | 425/46 |
| 6,632,393 B2 | | 10/2003 | Fike | 264/501 |
| 6,841,113 B2 | | 1/2005 | Caretta | 264/326 |
| 6,949,213 B1 | | 9/2005 | Kata et al. | 264/326 |
| 7,056,109 B2 | | 6/2006 | Kata | 425/46 |

FOREIGN PATENT DOCUMENTS

JP     2000-127173     10/1998

* cited by examiner

*Primary Examiner* — James Mackey
(74) *Attorney, Agent, or Firm* — June E. Rickey

(57) ABSTRACT

The present invention relates to an apparatus for providing the upper and lower portions of two-part tire molds with an expansible opening to provide clearance for the insertion of green tires, in particular large green tires of the sort used on industrial or off-road vehicles. The tire mold according to the present invention provides a segmented tire mold wherein a plurality of circumferentially arranged segments that contribute to the shaping of the circumferential tread portion of a tire being molded are able to move in such a way as to include a radial and axial component of motion that provides a larger diameter for each of the two mold portions during the green tire loading operation. Thus the internal circumferential region of the top portion and of the bottom portion is able to expand in diametrical dimension when the two part tire mold is open.

5 Claims, 8 Drawing Sheets

SEGMENTED TIRE MOLD

TECHNICAL FIELD

This invention relates in general to tire molds, and more particularly to tire molds for large heavy duty tires.

BACKGROUND OF THE INVENTION

The manufacturing of pneumatic tires for motor vehicles of nearly all sizes entails the steps of creating the carcass and attaching thereto the tread and sidewalls, which are made of uncured rubber. The combination of carcass, tread and sidewalls, prior to curing of the rubber, is called a 'green tire.' The final step in the manufacture of a tire is the insertion of the green tire into a tire mold, wherein the tire is heated to a sufficiently high temperature to vulcanize the tire. The tire is then removed from the mold and the manufacturing process is complete.

Whereas the manufacturing of tires for automobiles, even large automobiles such as sport utility vehicles, is a straightforward process involving relatively light-weight green tires, the manufacture of large tires for industrial or large off-road type vehicles of the sort used in earth moving and construction work entails the handling of very large green tires weighing hundreds of pounds. The loading of such massive tires, in the green-tire stage of production, into the standard two-part tire molds having an upper portion and a lower portion can result in damage to the green tires during the loading process, because the diametrical and circumferential dimensions of the mold are so close to each green tire being loaded into the mold as to result in interference. Thus it is desired to have an improved tire mold which allows for ease of loading and unloading of the green tire into and out of the tire mold.

BRIEF DESCRIPTIONS OF THE FIGURES

The structure, operation, and advantages of the present preferred embodiment of the invention will become further apparent upon consideration of the following description taken in conjunction with the accompanying FIGURES, wherein.

DEFINITIONS

"Axial" refers to the direction that is parallel to the primary axis of a tire or a tire mold.

"Major Axis" refers to the major cylindrical axis of a circular cylinder.

"Radial" refers to the direction that is normal to the primary axis of a tire or to a tire mold.

DETAILED DESCRIPTION OF THE INVENTION

Figure 1:
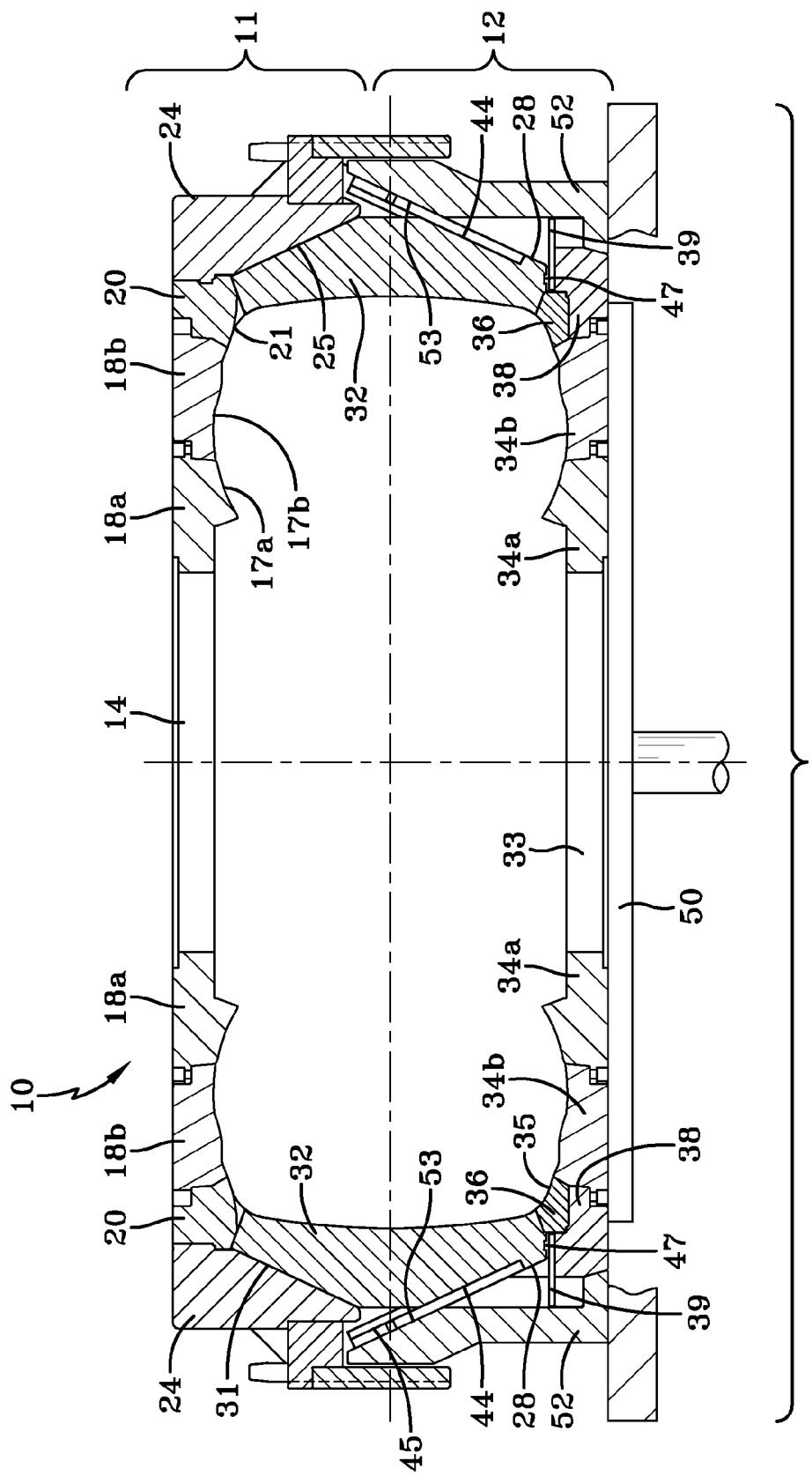
FIG. 1 is a cross-sectional side view of a tire mold of the present invention shown in the closed position.
Figure 2:
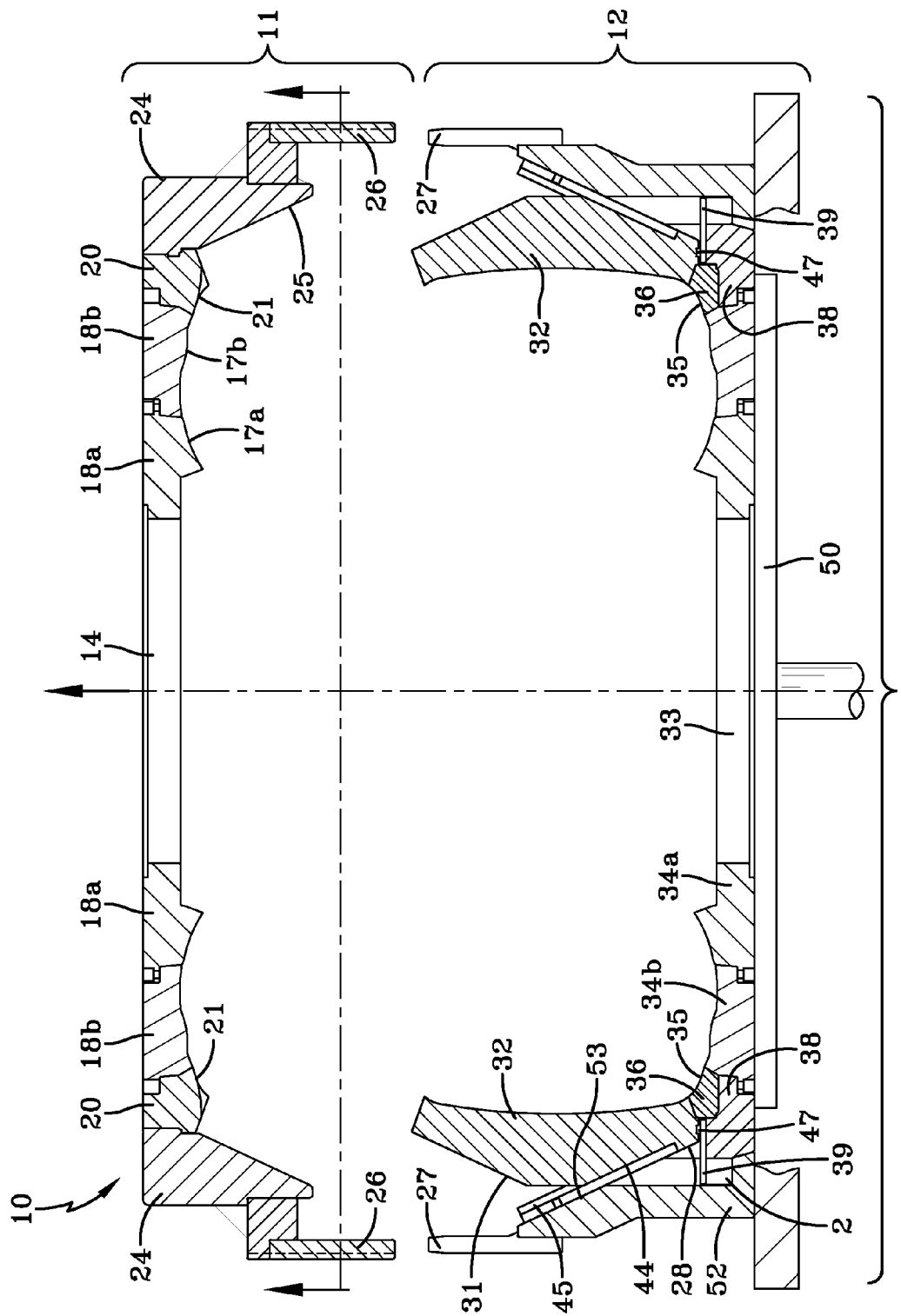
FIG. 2 is a cross-sectional side view of the tire mold of FIG. 1 shown in the open position.

FIG. 1 illustrates a cross-sectional side view of an improved tire mold 10 of the present invention shown in the closed position, while FIG. 2 illustrates the mold in the open position. The mold as shown has an upper portion 11 which includes a sidewall annular ring 18 having a central opening 14. The sidewall annular ring 18 may be further divided into two or more sidewall components 18a, 18b as shown, for ease of manufacturing. The sidewall components 18a, 18b each include an inner surface 17a, 17b for molding the sidewall of a tire. The upper mold portion 11 further includes an optional annular shoulder ring 20. The optional shoulder ring 20 is located between the sidewall components 18a, 18b and an annular actuating ring 24. The shoulder ring has an inner molding surface 21 for molding the shoulder/tread area of the tire. The annular actuating ring 24 comprises an inner frustroconical surface 25 aligned for engagement with an outer frustroconical surface 31 of the tread segments, and functions to align the tread segments during closing of the mold.

Mounted on the exterior surface of the annular actuating ring are two or more alignment cylinders 26 positioned for receiving an alignment pin 27 mounted on the outer circumference of the lower mold portion. The alignment pins 27 together with the alignment cylinders ensure proper alignment of the upper portion of the mold with the lower portion of the mold.

Referring again to FIG. 1, a lower portion 12 of the mold 10 includes a lower sidewall ring 34 having a central opening 33. The lower sidewall ring may be further subdivided into two or more components 34a, 34b. An optional shoulder ring 36 is positioned radially outward of the sidewall ring. The optional shoulder ring has a tread forming surface 35 for forming the shoulder section of the tire and an axially inward surface 37 in engagement with an annular lifting ring 38.

Figure 10A:
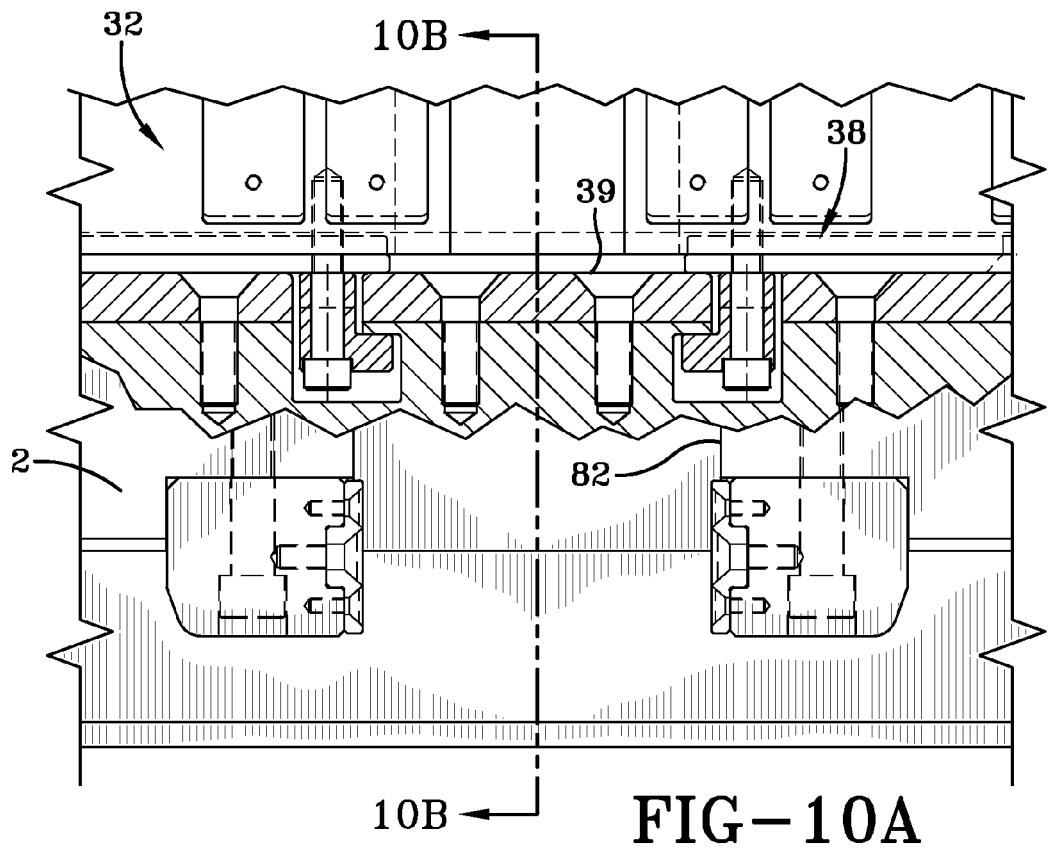
FIG. 10A is an end view of an annular lifting ring.
Figure 10B:
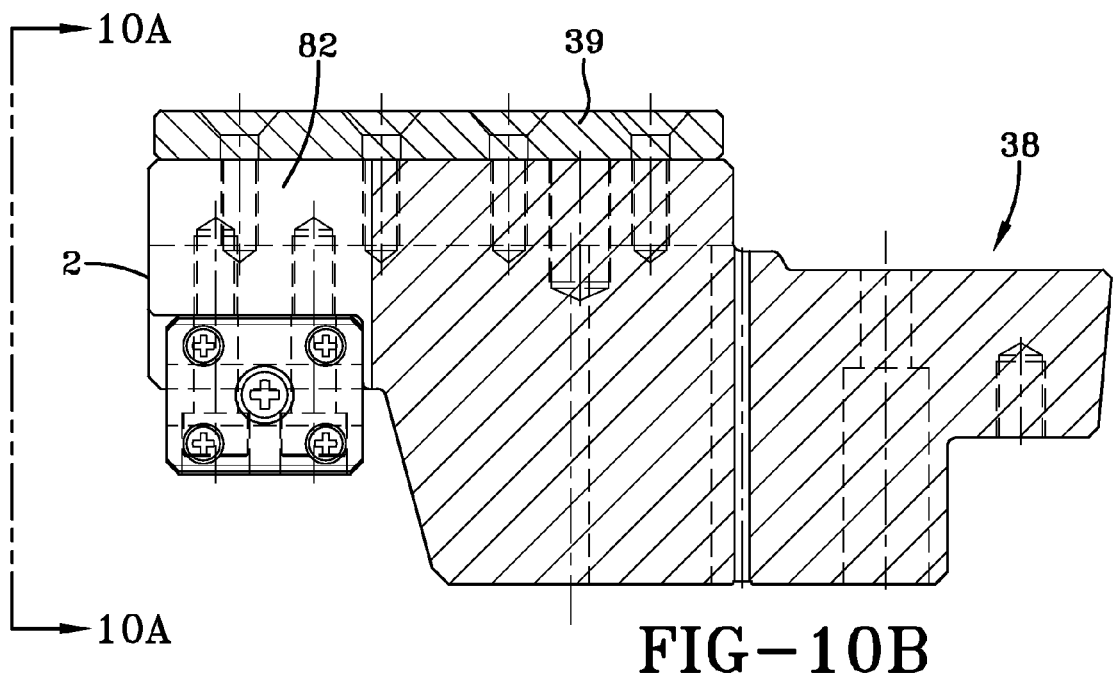
FIG. 10B is a side view of the annular lifting ring.

The annular lifting ring 38 is positioned between a bottom mold ring 52 and the lower sidewall ring components 34a, 34b. The annular lifting ring 38 is fixedly connected to the sidewall ring 34 and the optional shoulder ring 36. As shown in FIGS. 10A and 10B, the annular lifting ring has a tabular end 2 that is received within a slot 3 of the bottom mold ring 52, wherein the tabular end of the annular lifting ring is in slidable engagement with the slot 3 of the bottom mold ring 52. The annular lifting ring further comprises an axially outer surface 39 for engagement with the tread segments. The axially outer surface 39 may further include an optional wear plate.

Figure 8:
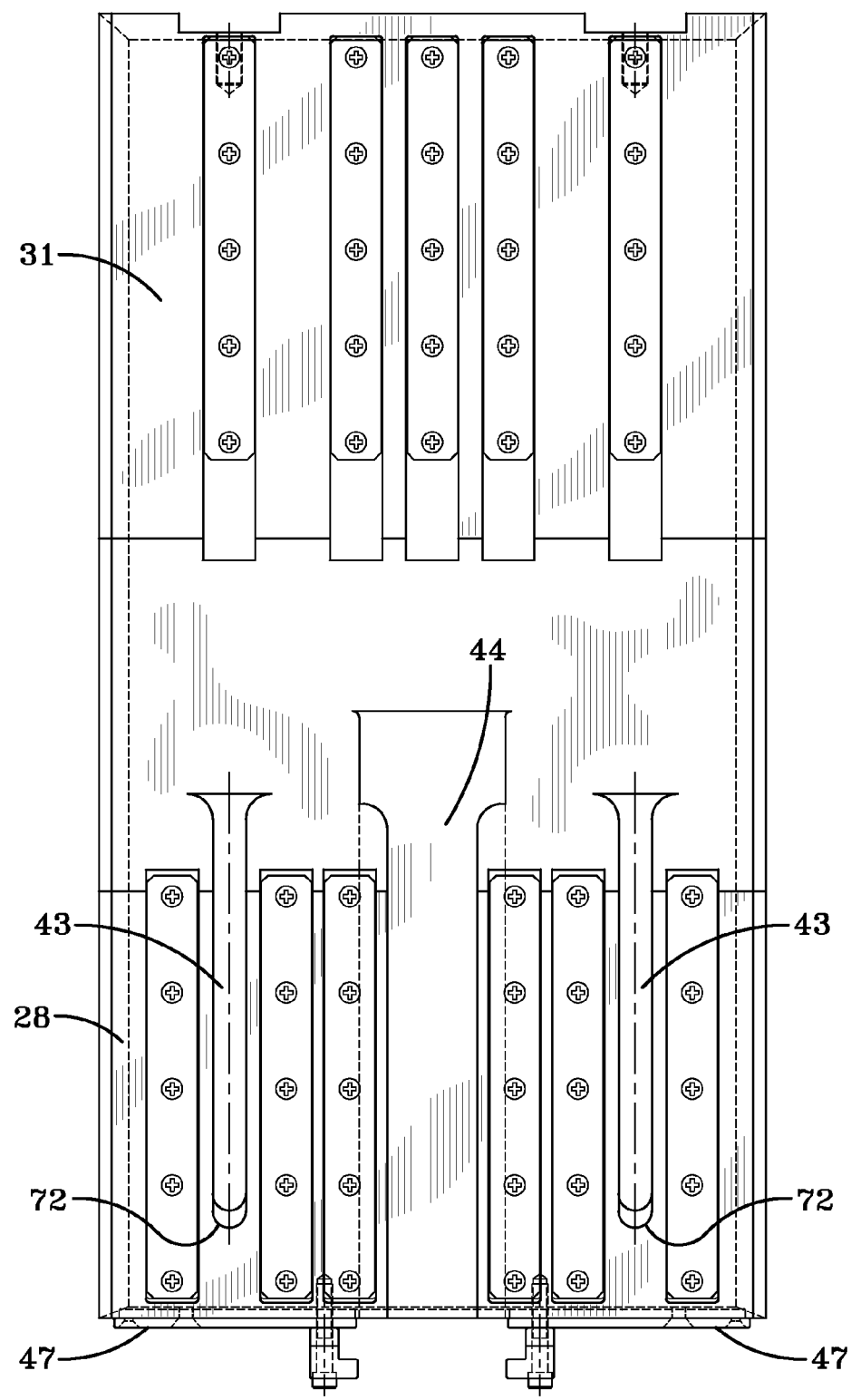
FIG. 8 is a rear view of a mold segment.
Figure 9:
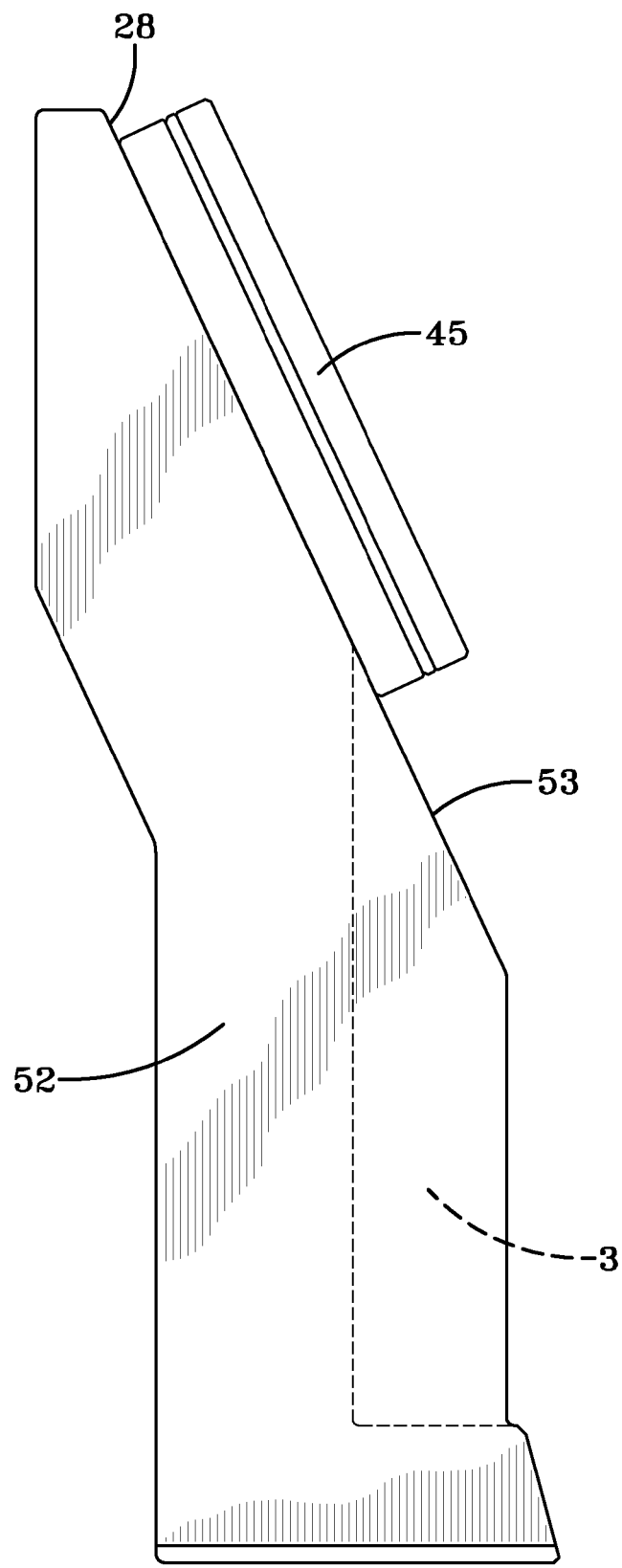
FIG. 9 is a side view of a lower actuating ring.
Figures 11A, 11B:
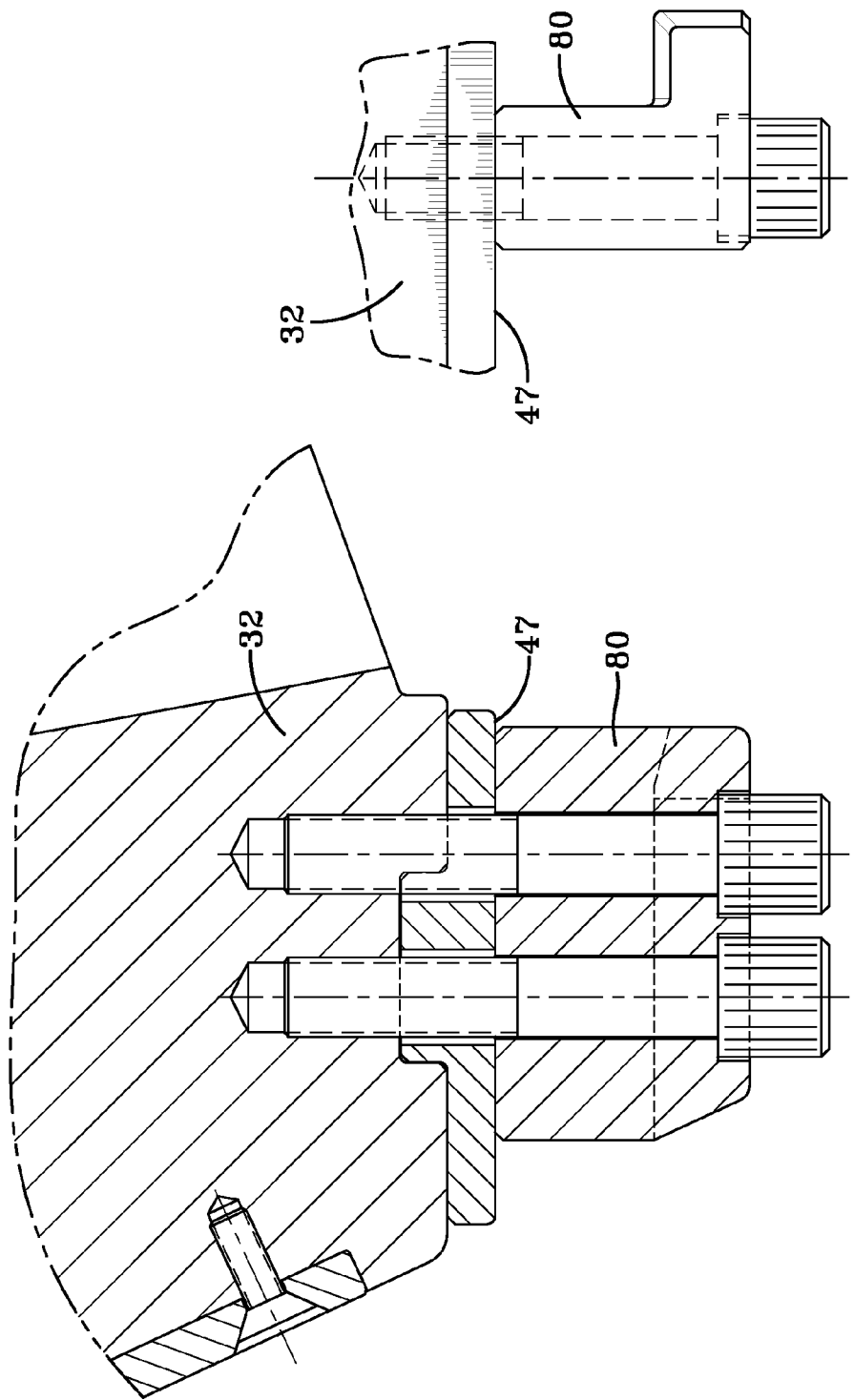
FIG. 11A is a side view of a bottom portion of a tread segment shown with an optional guide fin.
FIG. 11B is a front view of a bottom portion of a segment and an optional guide fin.

The lower portion of the mold further comprises a plurality of tread segments 32, which are arranged circumferentially about the green tire to be molded. Each tread segment 32 has a tread molding surface 33 having for example, lands and grooves for molding the tread of a green tire. The tread segments join together to form an annular ring to encircle and mold a tread of a green tire. Preferably, each tread segment is formed of a one piece unit and is not split into two or more pieces. Thus each tread segment has a tread molding surface 33 which extends substantially unbroken across the outer tread surface of the green tire, from one shoulder to the opposite shoulder. As shown in FIG. 8, each tread segment further has an upper frustroconical surface 31 opposite the tread molding surface that is aligned for engagement with the conical surface 25 of the annular actuating ring 24. Each tread segment 32 further comprises a lower frustroconical surface 28 that is aligned for engagement with a frustroconical surface 53 of the bottom mold ring 52. The tread segment lower conical surface 28 further includes a groove 44 for receiving a guide member 45 therein. As shown in FIG. 9, the guide member 45 is positioned on the inner frustroconical surface 53 of the bottom mold ring 52 and is slidable within the tread segment groove 44. At other circumferential locations, one or more guide pins 43 are positioned on the inner frustroconical surface 53 of the bottom mold ring 52. Each guide pin 43 is received in a groove 72 located on the lower frustroconical surface 28 of the segment 32 as shown in FIG. 8. The guide pins 43 act as a stop to prevent the segments from moving too far axially outward. The guide pins 43 may also have a tight tolerance with respect to tread segment groove 72 to ensure precise movement or translation of the segments during opening and closing of the molds. Each tread segment further has an axially inner surface 47 that is slidable along the outer surface 39 of the bottom lifting ring 38. As shown in FIGS. 11A and 11B, the tread segment radially inner surface 47 may further comprise optional guide fins 80 that are slidably received in slots 82 of the lower lifting ring 38.

Each segment is actuatable in both a radial and an axial direction. During the opening of the mold, each segment is actuated axially and radially by a lifting plate 50. The lower mold components including the lower sidewall ring 34a, 34b and the annular lifting ring 38 are positioned upon the lifting plate 50. As the lifting plate lifts the lifting ring 38 and the sidewall components 34, the annular lifting ring 38 slides in an axial direction within the outer mold ring 52 and lifts the segments. As the segments are lifted, the segment radially inner surface 47 slides radially outward along the surface 39 of the lifting ring. As the lifting plate 50 lifts the tread segments, the segment lower frustroconical surface 28 slides into engagement with the cammed or frustroconical surface 53 of the bottom mold ring 52.

As the segments are lifted, the guide members of the mold bottom half slide within the groove 44 of the segment outer surface to ensure the segments slide axially and radially outwards. The optional guide fins 80 may be utilized to guide the segments as they are slid axially, and may further assist the movement of the tread segments during closing of the mold.

Figure 3:
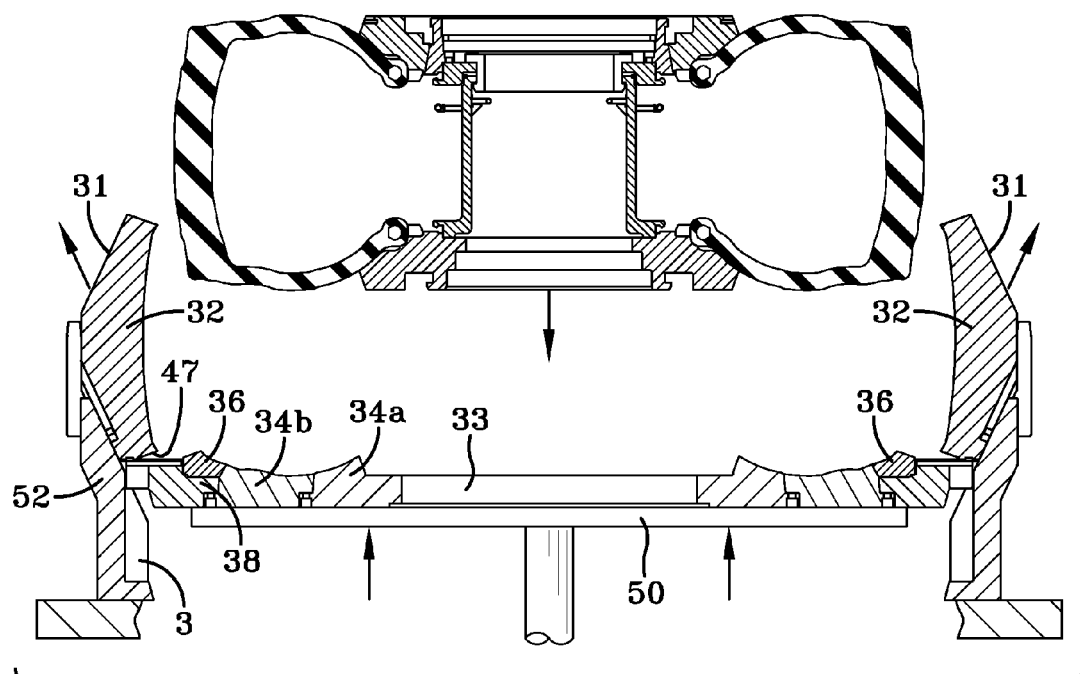
FIGS. 3-6 are cross-sectional side views of the tire mold of FIG. 1, showing the sequence of a tire being loaded into the tire mold.

FIGS. 3-7 illustrate the loading of a green tire into the mold. As shown in FIG. 2, the upper portion 11 of the mold is removed. The lifting plate 50 is raised to its maximum vertical elevation relative to the lower actuating ring 52 as shown in FIG. 3. Also at maximum vertical elevation are those parts of the lower mold portion 12 that are lifted by the lower actuating ring 52, namely the sidewall ring 34, the shoulder ring 36, the annular lifting ring 38 and the segments 32. At the maximum vertical elevation of the lifting plate, the segments are positioned in an open position wherein they are disposed at their maximal radial displacement from one another. This position provides clearance for the insertion of a green tire.

Figure 4:
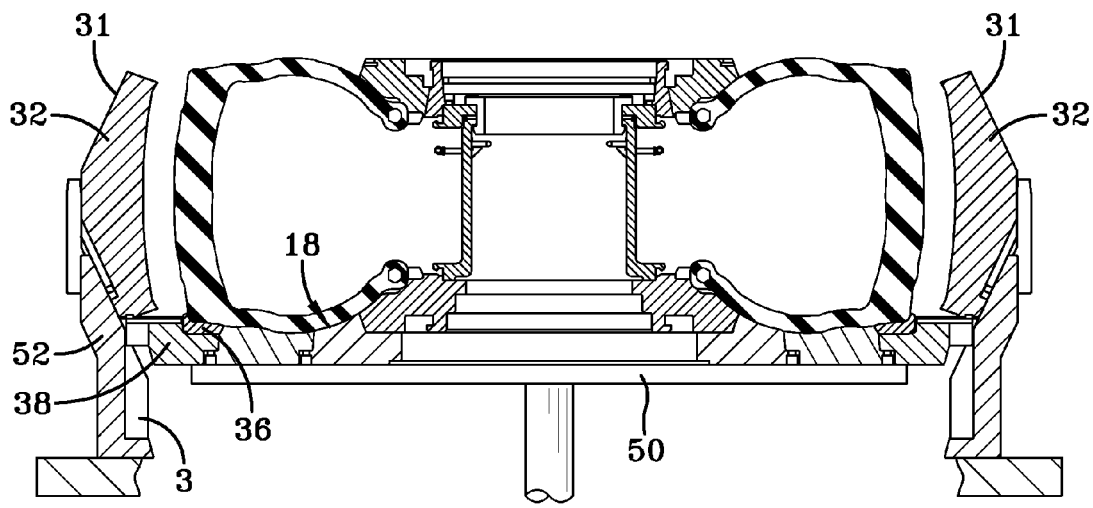
Figure 5:
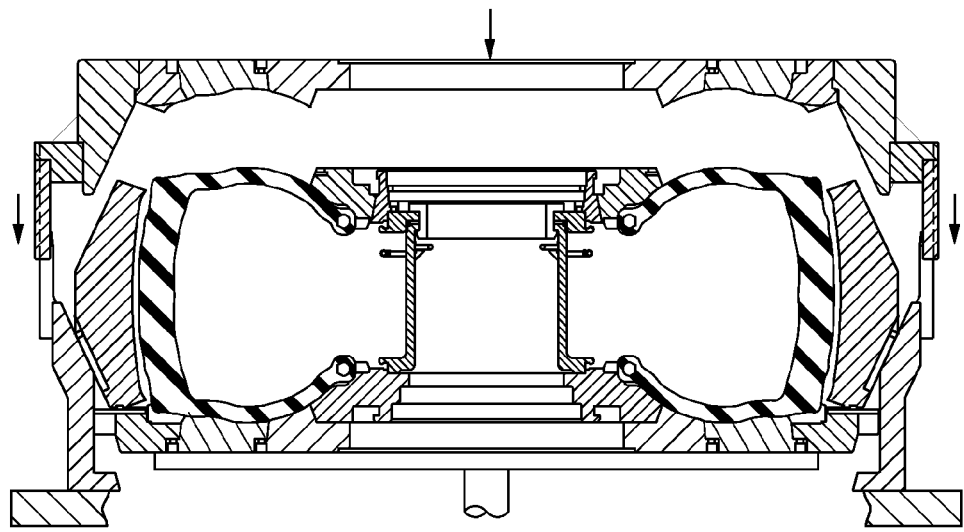
Figure 6:
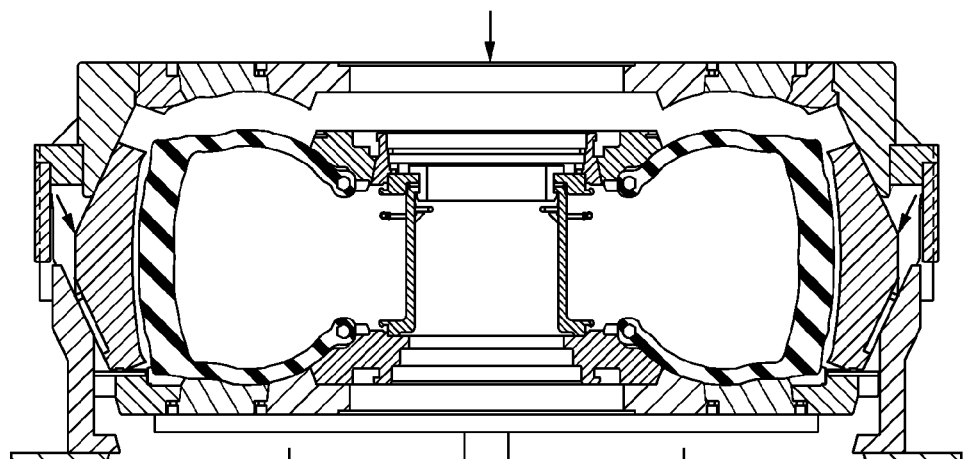
Figure 7:
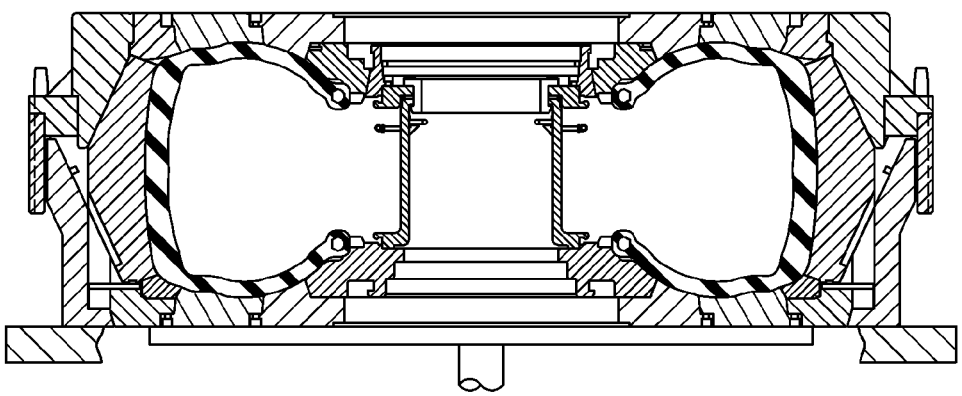
FIG. 7 is a cross-sectional side view of the tire mold of FIG. 1 shown in the closed position.

Once the green tire had been loaded into the lower mold portion 12 as shown in FIG. 4, the lifting plate lowers the lower mold portion 12 to a point where the segments 32 almost make contact with the green tire as shown in FIGS. 4-6. Next the upper mold portion 11 is lowered until the camming surface of the upper mold ring contacts the upper segment outer wall 31 (FIG. 6). Then the upper and lower mold portions are lowered by the lifting plate, as the upper mold ring guides the segment into position (FIG. 7). When the mold 30 is fully closed and the top segments 42 and the bottom segments 43 are in their radially inward most locations (with respect to centerline CL), the upper dowels engage and lock with the lower dowels.

The mold opening can now be described in more detail. The upper part 11 of the mold 10 is hoisted or otherwise lifted vertically off of the tire (not shown) and the lower portion 12 of the mold. Upon lifting of the upper portion as shown in FIG. 2, the tread segments 32 slide along the mold lower half to a lower and diametrically larger position within the conical section upper actuating ring 44, causing said segments to move radially apart from one another with respect to the main axis CL of the upper portion 32 of the tire mold 30.

Upon removal of the upper portion of the tire mold 30, actuation of the lifting place 50 and the parts lifted by the lifting plate causes the tire to rise upward and the movable segments to move apart from one another and from the tire, thereby providing clearance for easy removal of the tire.

The mold as described herein has the advantage of a design which does not require any springs.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed:

1. A tire mold comprising an upper mold portion and a lower mold portion, wherein the upper mold portion and the lower mold portion are movable relative to one another for insertion of a tire into the mold; wherein the upper mold portion includes an upper sidewall ring and an annular actuating ring having an inner frustroconical surface; wherein the lower portion includes a plurality of segments, each segment having an upper frustroconical surface and a lower frustroconical surface; wherein the inner frustroconical surface of the annular actuating ring is positionable for slidable engagement with the upper frustroconical surface of each segment, wherein the lower frustroconical surface of each segment is slidable against an inner frustroconical surface of a bottom mold ring; wherein the mold further includes a lifting plate; a lower sidewall ring; and an annular lifting ring positioned between the bottom mold ring and the lower sidewall ring, wherein the annular lifting ring, the segments and the lower sidewall ring are positioned on the lifting plate for axial movement; the annular lifting ring having a first end slidable within a slot of said bottom mold ring, and the annular lifting ring having an axially outer surface for engagement with an axially inner surface of each segment.

2. The mold of claim 1 wherein the bottom mold ring has a plurality of guide members positioned circumferentially on the inner frustroconical surface of the bottom mold ring, and wherein the guide members are positioned for reception in a respective groove located on the lower frustroconical surface of each segment.

3. The mold of claim 1 wherein the bottom mold ring further comprises a plurality of guide pins positioned circumferentially on the inner frustroconical surface of the bottom mold ring, and wherein the guide pins are positioned for reception in a respective groove located on the lower frustro-conical surface of each segment.

4. The mold of claim 1 wherein the lower sidewall ring and the lifting ring are mounted on the lifting plate.

5. The mold of claim 1 wherein there are no springs in said mold.

* * * * *